United States Patent

Takehara et al.

[11] Patent Number: 6,036,368
[45] Date of Patent: Mar. 14, 2000

[54] DYNAMIC PRESSURE BEARING DEVICE

[75] Inventors: Isamu Takehara; Tomohiko Hayashi, both of Narashino, Japan

[73] Assignee: Seiko Seiki Kabushiki Kaisha, Japan

[21] Appl. No.: 08/987,732

[22] Filed: Dec. 9, 1997

[30] Foreign Application Priority Data

Dec. 10, 1996 [JP] Japan .................................. 8-346738
Dec. 10, 1996 [JP] Japan .................................. 8-346739

[51] Int. Cl.⁷ .................................................. F16C 17/10
[52] U.S. Cl. .......................................................... 384/112
[58] Field of Search ................................... 384/107, 112, 384/113, 123, 124

[56] References Cited

U.S. PATENT DOCUMENTS

| | | | |
|---|---|---|---|
| 3,420,583 | 1/1969 | Hirs et al. | |
| 3,484,143 | 12/1969 | Tallian et al. | |
| 4,445,793 | 5/1984 | Shinohara | 384/130 |
| 5,433,529 | 7/1995 | Hensel | 384/112 |
| 5,533,811 | 7/1996 | Polch et al. | 384/107 |
| 5,658,080 | 8/1997 | Ichiyama | 384/112 |

*Primary Examiner*—Lenard A. Footland
*Attorney, Agent, or Firm*—Adams & Wilks

[57] ABSTRACT

A dynamic pressure bearing device comprises a rotary member mounted for rotation, and a dynamic pressure bearing rotatably supporting the rotary member. The dynamic pressure bearing has a stationary portion and a disk integrally connected to the stationary portion. The disk has surface portions defining thrust dynamic pressure bearing portions for supporting the rotary member in an axial direction and a radial dynamic pressure bearing portion for supporting the rotary member in a radial direction. A gap is disposed between the dynamic pressure bearing and the rotary member for receiving oil. A space is provided in fluid communication with the gap. The space has a central portion slanted downwardly in the radial direction for preventing leakage of the oil and has a diameter increasing gradually from the central portion in the radial direction.

14 Claims, 6 Drawing Sheets

DYNAMIC PRESSURE BEARING DEVICE

BACKGROUND OF THE INVENTION

1. Field of the Invention

The present invention relates to a dynamic bearing device used as a bearing for a motor such as a spindle motor.

2. Background

Conventionally, as this type of dynamic bearing device, one as shown in FIG. 6 or FIG. 7 is known.

As shown in FIG. 6, this type of dynamic bearing device is known as one composed of a cylindrical radial dynamic pressure bearing 2 and a flange-shape thrust dynamic bearing 2b which follows the radial dynamic pressure bearing 2. A rotary member 3 is radially supported by the radial dynamic pressure bearing 2, whereas the rotary member 3 is axially supported by the thrust dynamic pressure bearing 2b.

As shown in FIG. 6, grooves 2c are formed in the circumferential direction of the bearing surface of the radial dynamic bearing 2, whereas grooves (not shown) are also formed in the bearing surface of the thrust dynamic pressure bearing 2b in the same manner. Oil is filled in a gap 5 between the radial dynamic pressure bearing 2, the thrust dynamic bearing 2b and the rotary member 3.

Further, FIG. 7 shows the detailed construction of the dynamic pressure bearing device. As shown in FIG. 7, this dynamic pressure bearing device has a stationary base 1. A lower portion of a cylindrical radial bearing portion 2 is fitted and fixed to a center of a stationary base 1. A thrust bearing portion 2b is formed on the upper portion of this radial bearing portion 2.

A rotary member composed of a bottomed rotor 3, a thrust retaining member 4 and the like is rotatably supported by the radial bearing portion 2 and the thrust dynamic pressure bearing 2b. A gap 5 for retaining the oil is formed between the rotary member, the radial bearing portion 2 and the thrust dynamic pressure bearing 2b.

As shown in FIG. 7, a magnet 6 is fixed to an inner circumferential surface of the bottomed rotor 3, and a motor is defined between this magnet 6 and a stator 7 formed by winding wirings around an iron core fixed to the side of the stationary base 1.

An annular oil sump 9 is formed between the lower surface of the bottomed rotor 3 and the stationary base 1 to be in communication with the gap 5, as shown in FIG. 7. Following the oil sump 9, a space 8 with its central portion slanted from the central portion in the radial direction is formed between the lower surface of the bottomed rotor 3 and the upper surface of the stationary base 1.

An oil feed hole 2a is formed in the axial direction of the center of the thrust dynamic pressure bearing 2. The oil that has been fed from the oil feed hole 2a is filled from a final end of the oil feed hole 2a to the gap 5. The overflown oil from the gap 5 is to be received into the oil sump 9.

According to the dynamic pressure bearing having such a structure, when the rotary member including a bottomed rotor 3 is started for rotation, due to the viscosity of the oil, the oil is entrained into the narrow portions of the gap 5 and compressed to increase the pressure of the oil. Thus, the pressure is on the balance with the weight of the rotary member to support the rotary member and to thereby form oil films in the gap 5. Thus, the rotary member is supported in a non-contact state to the radial dynamic pressure bearing 2 and the thrust dynamic pressure bearing 2b by the dynamic pressure generated by the rotation of the rotary member.

However, as shown in FIG. 7, the oil sump 9 is formed between the lower surface of the bottomed rotor 3 and the upper surface of the stationary base 1, and the space 8 is formed in communication with this oil sump 9.

Since the vertical width of the space 8 is very small, even if the bottomed rotor 3 is stopped, the oil is raised to the bottom portion of the space 8 by the capillary action.

On the other hand, upon the rotation of the bottomed rotor 3, since the centrifugal force caused by the rotation is applied to the interior of the space 8, the oil is further raised through the space 8. As a result, there is a fear that the raised oil would be leaked from the opening portion of the space 8.

Further, in the conventional dynamic pressure bearing device shown in FIG. 7, in order to miniaturize and thin the rotary member 3, it is necessary to shorten the radial dynamic pressure bearing 2.

However, even if the radial dynamic pressure bearing 2 is simply shortened without changing the conventional design, it is impossible to obtain a sufficient dynamic pressure in the radial direction of the rotary member 3, and it would not be possible to meet the requirements of the miniaturization and flatness.

SUMMARY OF THE INVENTION

Accordingly, an object of the present invention is to provide a dynamic pressure bearing device that may prevent oil leakage.

Another object of the present invention is to provide a dynamic pressure bearing device which may ensure a sufficient rigidity when the rotary member is to be miniaturized and thinned into a flat form.

In order to attain the first object, according to a first embodiment of the present invention, there is provided a dynamic pressure bearing device comprising: a dynamic pressure bearing fixed to a stationary base; a rotary member (bottomed rotor or the like) supported rotatably to an outer circumference to the dynamic bearing; a gap formed between the dynamic pressure bearing and the rotary member for receiving oil therein; and a space communicated with the gap and formed between the rotary member and the stationary base, and having a central portion slanted downwardly in a radial direction for preventing an oil leakage; characterized in that an opening area of this space is gradually increased from the central portion of the space in the radial direction.

In order to attain the second object, according to a second embodiment of the present invention, there is provided a dynamic pressure bearing device comprising a disk (flange disk) fixed to a stationary portion for bearing, A top surface and a bottom surface of the disk are used as thrust dynamic pressure bearing portions for supporting a rotary member in an axial direction, and an outer circumferential surface of the disk is used as a radial dynamic pressure portion for supporting the rotary member in a radial direction.

A plurality of thrust grooves are formed in a circumferential direction of each of the top surface and the bottom surface of the disk, and a plurality of radial grooves are formed in a circumferential direction on the outer circumferential surface of the disk.

Thus, according to the first embodiment of the present invention, when the rotary member stops rotating, the oil within the oil sump is raised to the bottom portion within the space by the capillary action. On the other hand, upon the rotation of rotary member, since the centrifugal force caused by the rotation works on the oil within the space, the oil is likely to be further raised in the space.

However, the opening area of this space is gradually increased from the central portion in the radial direction.

Accordingly, in the space, the action of raising the oil by the centrifugal force is weakened, so that the oil within the space is only somewhat raised, and there is no fear of the leakage to the outside.

According to the second embodiment of the present invention, it is possible to increase the radial length of the radial dynamic pressure bearing portion in comparison with the conventional bearing. Accordingly, even if its height is reduced, it is possible to obtain a rigidity enough to support the rotary member. Accordingly, in order to miniaturize and flatten the rotary member to be born, it is possible to reduce the overall height of the dynamic pressure bearing to miniaturize the bearing while keeping a sufficient rigidity.

Preferably the thrust dynamic pressure bearing portions and the radial dynamic pressure bearing portion are bearings of a motor, and the rotary member is a rotary portion of the motor. Furthermore, it is preferable that the motor is a high speed rotational motor.

Further, a rotary apparatus can be constructed by using the spindle motor as a drive means for driving the rotary portion.

DETAILED DESCRIPTION OF THE PREFERRED EMBODIMENTS

A dynamic pressure bearing device according to a preferred embodiment of the invention will now be described in detail with reference to FIGS. 1 to 5.

Figure 1:
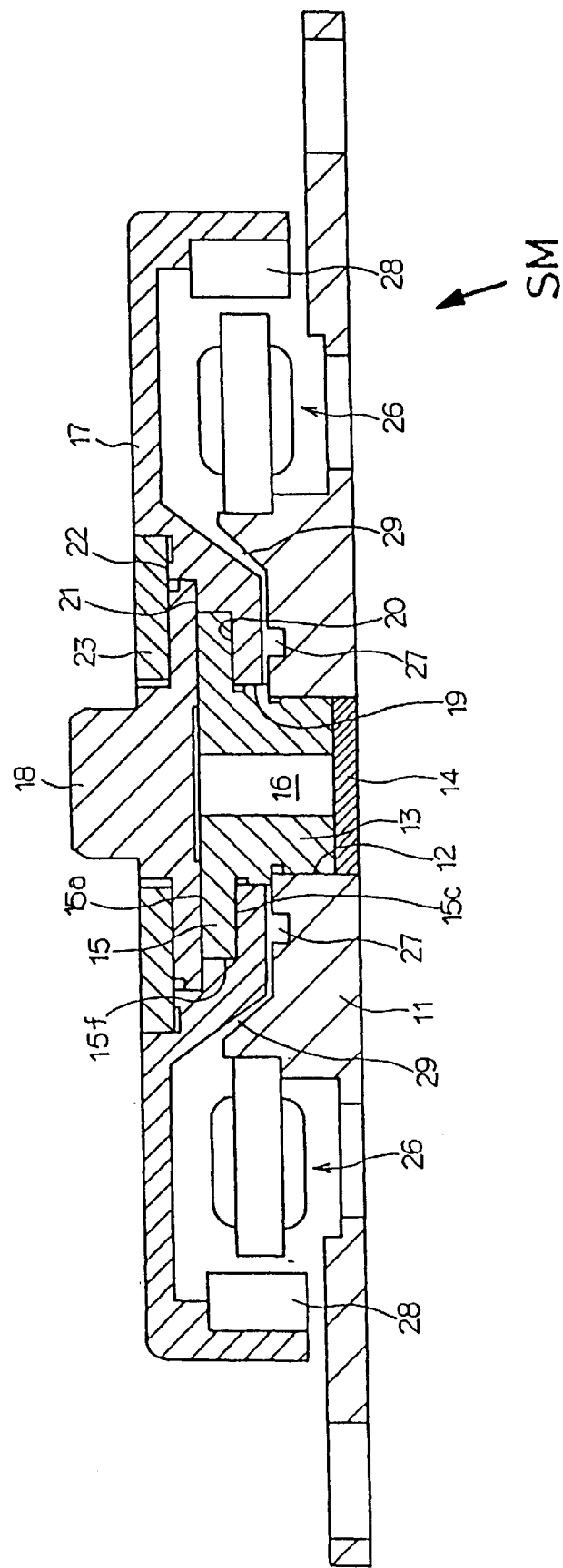
FIG. 1 is a cross-sectional view showing a dynamic pressure bearing device according to an embodiment of the invention in the case where it is applied to a spindle motor.

FIG. 1 is a cross-sectional view showing an overall structure in the case where the dynamic pressure bearing device according to this embodiment is applied to a spindle motor of high speed rotation.

In this embodiment, as shown in FIG. 1, there is provided a stationary base 11. A central hole 12 is formed at the center of the stationary base 11. A lower portion of a cylindrical stationary shaft 13 is press-fitted into the central hole 12.

Figure 2:
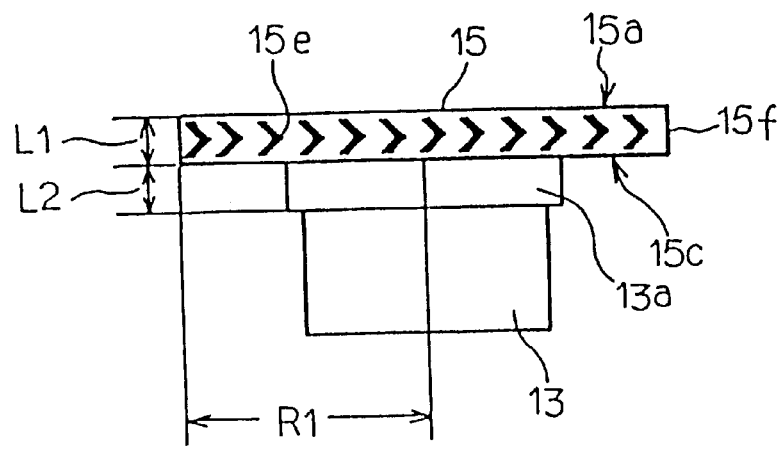
FIG. 2 is a frontal view showing the bearing portion of this embodiment.

As shown in FIGS. 1 and 2, a flange disk 15 for the bearing is provided coaxially with the stationary shaft 13 in the upper portion of the stationary shaft 13. Although this flange disk 15 is formed integrally with the stationary shaft 13, instead thereof, the flange disk 15 maybe formed discretely from the stationary shaft 13 and may be coupled therewith by a suitable means.

An oil feed hole 16 for feeding oil is provided in the axial direction of the inner central portion of the stationary shaft 13. An opening of the oil feed hole 16 may be covered by a sealing cover 14 after the replenishment of the oil.

An outer circumferential surface of the flange disk 15 is formed as a radial dynamic pressure bearing portion 15f for supporting in the radial direction the rotary member composed of a bottomed rotor 17 and a thrust retaining portion 18.

As best shown in FIG. 2, a plurality of radial grooves 15e into which the fluid is forcibly introduced to generate the pressure are provided at equal intervals in the circumferential direction of the radial dynamic pressure bearing portion 15f, As shown in FIG. 2, each radial groove 15e is formed into, for example, a laterally V-shape with downstream ends stopped. In this arrangement, a width of the radial groove 15e is substantially equal to an interval between the adjacent radial grooves 15e.

The top surface and the bottom surface of the flange disk 15 are formed into thrust dynamic pressure bearing portions 15a and 15c, respectively, for supporting in the axial direction the rotary member composed of the bottomed rotor 17 and the thrust retaining portion 18.

Figure 3:
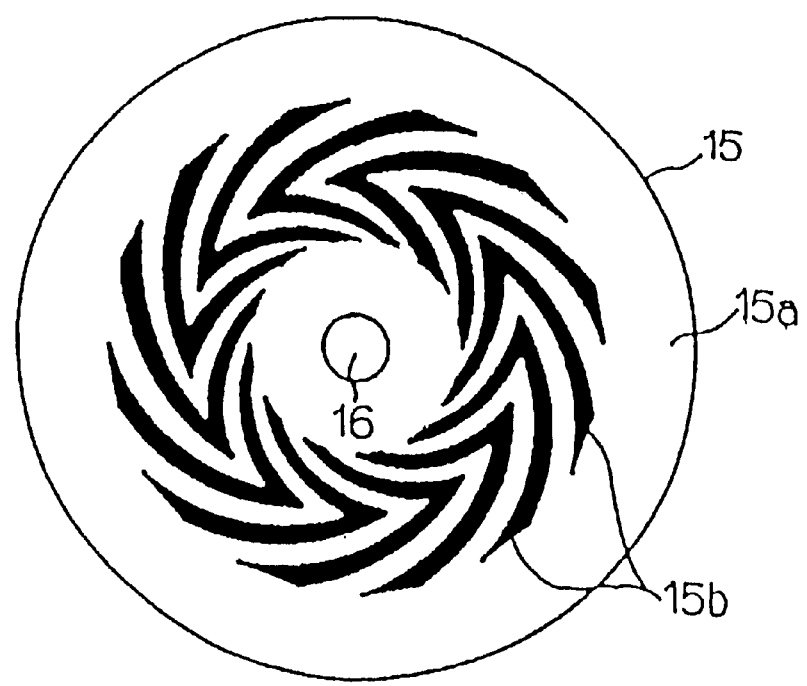
FIG. 3 is a plan view showing the bearing portion.

Also, as shown in FIG. 3, a plurality of thrust grooves 15b into which the fluid is forcibly introduced to generate the pressure are provided at equal intervals in the circumferential direction at a position away from the center at a predetermined distance on the thrust dynamic pressure bearing portion 15a. As shown in FIG. 3, a width of each thrust groove 15b is substantially equal to an interval between the adjacent thrust grooves 15b.

Figure 4:
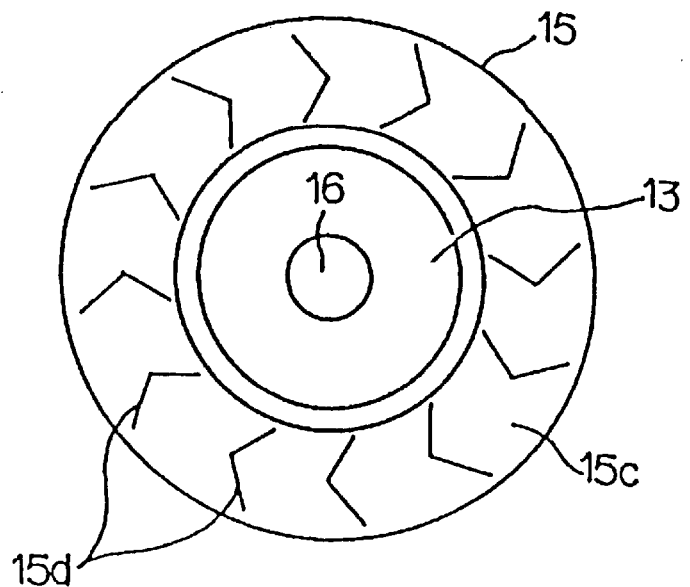
FIG. 4 is a bottom view showing the bearing portion.

Furthermore, as shown in FIG. 4, a plurality of thrust grooves 15d which are substantially the same as the thrust grooves 15b are provided at equal intervals in the circumferential direction at a position away from the center at a predetermined distance on the thrust dynamic pressure bearing portion 15c.

Incidentally, the thrust grooves 15d are schematically depicted in the drawing. As a matter of fact, the thrust grooves 15d are arranged in the same manner as in the thrust grooves 15b so that the width of each thrust groove 15d is substantially the same as that of the interval between the adjacent thrust grooves 15d.

A substantially inverted truncated conical recess is formed in the central portion of the bottomed rotor 17. A central hole 19 which is to be engaged with the upper outer circumference of the stationary shaft 13 is formed in the bottom of the recess. Three-stepped annular portions 20, 21 and 22 each of which is coaxial with the central hole 19 are formed on the flank of the recess.

The flange disk 15 is fitted in the stepped portion 20 and a flanged portion of the thrust retaining portion 18 is fitted in the stepped portion 21. Furthermore, an annular magnet 23 for chucking is fitted in the thrust retaining portion 18 with the outer circumferential portion of the magnet 23 fitted in the stepped portion 22.

With such an arrangement, the rotary member composed of the bottom rotor 17 and the thrust retaining portion 18 may be born in the axial direction by the thrust dynamic pressure bearing portions 15a and 15c and may be born in the radial direction by the radial dynamic pressure bearing 15f.

Figure 5:
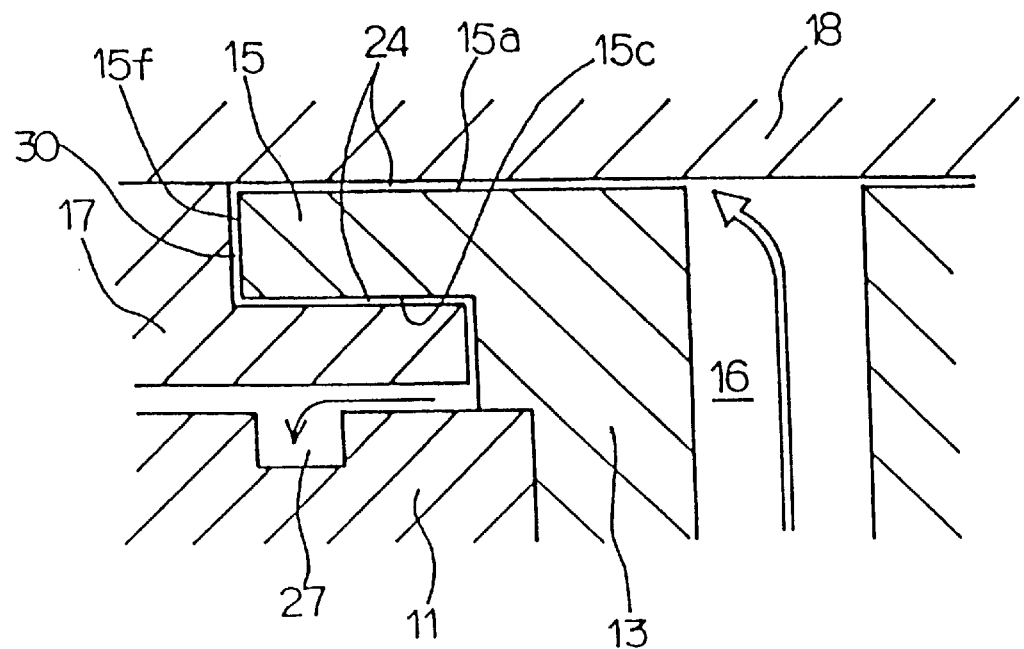
FIG. 5 is a cross-sectional view of the primary part thereof.

Then, as shown in FIG. 5, gaps 24 are formed between the thrust dynamic pressure bearing portions 15a and 15c and the rotary member, whereas a gap 30 is formed between the radial dynamic pressure bearing portion 15f and the rotary member.

As shown in FIG. 5, the oil that has been fed through the oil feed hole 16 is filled in the gaps 24 and the gap 30. The overflown oil is to be received in an annular oil sump 27, having a recessed cross-section, disposed on the central top portion of the stationary base 11. Thus the oil sump 27 is a reservoir for the overflown oil. After the oil is replenished, the opening of the oil feed hole 16 is covered by the sealing cover 14.

As shown in FIG. 1, the oil sump 27 is in communication with a passage or space 29 for preventing the oil leakage. The space 29 is a slanted space that is slanted at its central portion radially inwardly, and the opening area is gradually increased in the radial direction from the central portion.

A stator 26, which is formed by winding wirings around an iron core, is mounted at a position facing the magnet 28 mounted on the inner circumferential surface of the bottomed rotor 17 on the outer circumferential side of the stationary base 11.

The operation of the foregoing embodiment of the dynamic pressure bearing device with such an arrangement will now be described.

When the rotary member composed of the bottomed rotor 17 and the thrust retaining portion 18 is at a standstill, the inner circumferential surface (which is the surface to be born) of the rotary member is in contact with the surfaces of the thrust dynamic pressure bearings 15a and 15c and the radial dynamic pressure bearing 15f. For this reason, the gaps 24 and 30 are not kept constant but there are the wide and narrow portions.

Consequently, when the rotary member starts rotating due to the viscosity filled in the gaps 24 and 30, the oil is entrained and compressed in the narrow portions of the gaps 24 and 30 to increase the pressure of the oil. Therefore, the pressure is on the balance with the weight of the rotary member to support the rotary member so that oil films are formed in the gaps 24 and 30.

Thus, the rotary member composed of the bottomed rotor 17 and the thrust retaining portion 18 is supported in a non-contact state to the radial dynamic pressure bearings 15a and 15c and the radial dynamic pressure bearing portion 15f by the dynamic pressure generated by the rotation of the rotary member.

As described above, in the foregoing embodiment, the plurality of thrust grooves 15b and 15d are formed on the top surface and the bottom surface of the flange disk 15 to form the thrust dynamic pressure bearing portions 15a and 15c, whereas the plurality of radial grooves 15e are formed on the outer circumference of the flange disk 15 to form the radial dynamic pressure bearing portion 15f.

Figure 6:
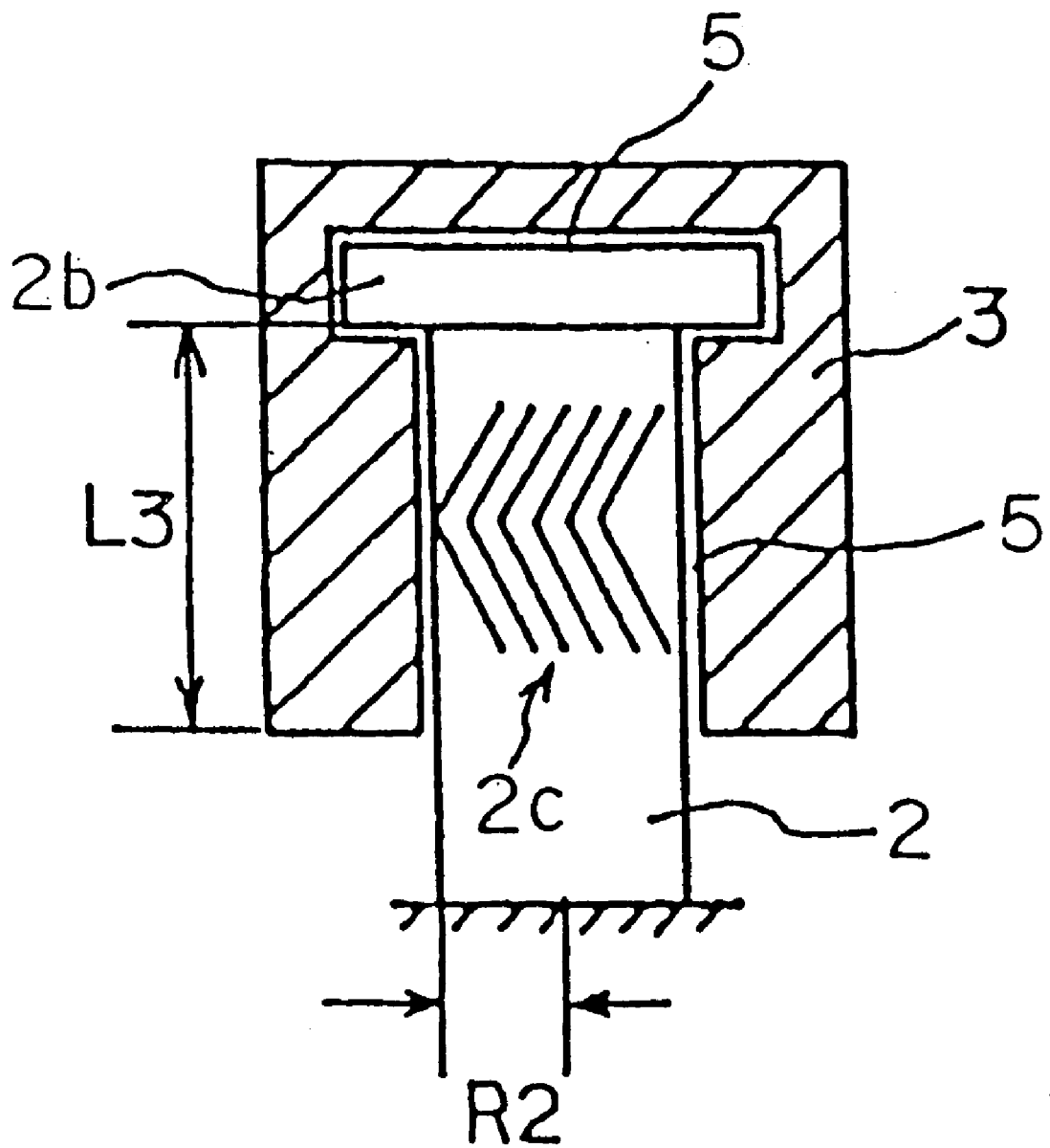
FIG. 6 is a cross-sectional view showing a conventional device.
Figure 7:
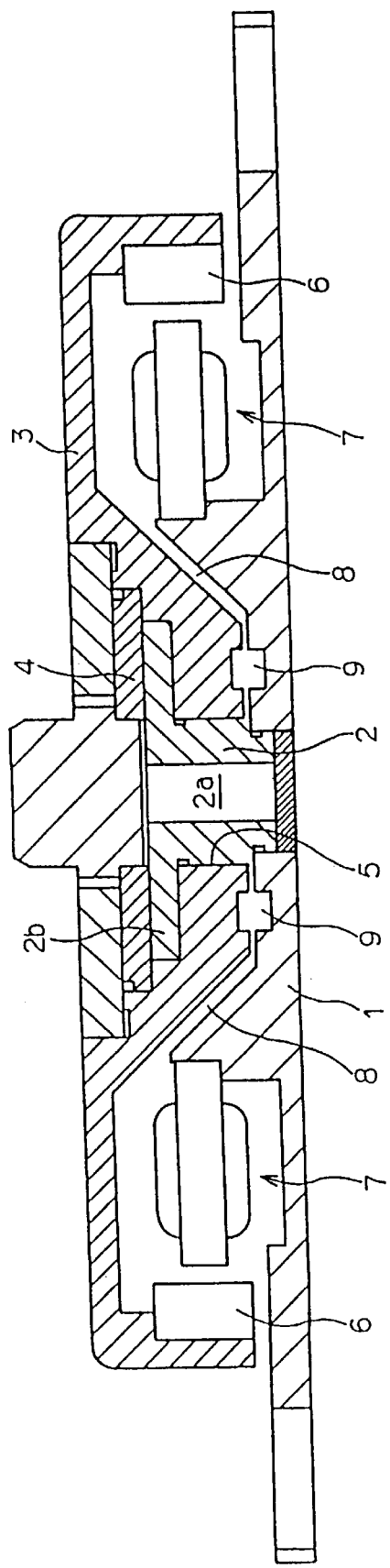
FIG. 7 is a cross-sectional view showing a conventional device.

For this reason, as shown in FIG. 2, a radial length R1 of the radial dynamic pressure bearing portion 15f is greater than the radial length R2 of the conventional radial dynamic pressure bearing 1 shown in FIG. 6. Accordingly, even if its height L1 is decreased, it is possible to ensure a rigidity enough to support the rotation of the bottomed rotor 17. Accordingly, according to this embodiment, it is possible to reduce the overall height of the dynamic pressure bearing when the rotary member composed essentially of the bottomed rotor 17 is miniaturized or flattened.

Incidentally, in the case where it is impossible to ensure the sufficient rigidity only with that corresponding to the height L1 of the radial dynamic pressure bearing portion 15f, in order to compensate for the deficient rigidity, as shown in FIG. 2, it is possible to apply the radial dynamic pressure bearing 13a to the upper portion of the stationary shaft 13 corresponding to the vertical height L2. In this case, the height L2 may be rather shortened in comparison with a height L3 of the conventional radial dynamic pressure bearing 1 shown in FIG. 6, so that the relationship, (L1+L2)<L3, is established. Accordingly, it is possible to reduce the overall height of the dynamic pressure bearing much more than the conventional one.

In this embodiment, since the thrust dynamic pressure bearing portions 15a and 15c and the radial dynamic pressure bearing portion 15f are formed integrally with the flange disk 15, the precision of a right angle between these portions can be improved.

Furthermore, in the embodiment, since the thrust dynamic pressure bearing portions 15a and 15c and the radial dynamic pressure bearing portion 15f are formed integrally in the flange disk 15 and the overall height of the dynamic bearing is shortened, it is possible to take a relatively large portion to be inserted into the central hole 12 of the lower portion of the stationary shaft 13, as a result of which the mounting strength of the stationary shaft 13 is increased.

Incidentally, in this embodiment, the thrust grooves 15b and 15d are formed for the thrust dynamic pressure bearing portions 15a and 15c and the radial grooves 15e are formed for the radial dynamic pressure bearing portion 15f. Instead thereof, it is possible to provide grooves in the surfaces, to be born, of the bottomed rotor 17, and also to provide the grooves in both the bearing portion and the bearing surface to be born.

Also, in this embodiment, although the explanation has been made as to the dynamic pressure bearings in which the gaps 24 and the gap 30 are filled with the oil, it is possible to apply the present invention to a dynamic pressure pneumatic bearing in which no oil is filled in the gaps 24 and the gap 30.

Furthermore, in this embodiment, although the explanation has been made as to the dynamic pressure bearings in which the flange disk 15 is fixed to the stationary base 11, it is possible to apply the present invention to a dynamic pressure bearing in which the flange disk 15 rotates.

Furthermore, upon the stop of the rotary member composed of the bottomed rotor 17, the oil within the oil sump 27 is raised up to the lower portion of the space 29 by the capillary action.

On the other hand, upon the rotation of the bottomed rotor 17, the centrifugal force caused by the bottomed rotor 17 is applied to the oil that has been raised to the bottom portion within the space 29 so that the centrifugal force is further increased and the oil is likely to be moved to the outside.

However, as shown in FIG. 1, the opening area is gradually increased in the radial direction from the central portion. Accordingly, in the space 29, the action of raising the oil by the centrifugal force is weakened, so that the oil within the space 29 is only somewhat raised, and there is no fear of the leakage to the outside.

Figure 8:
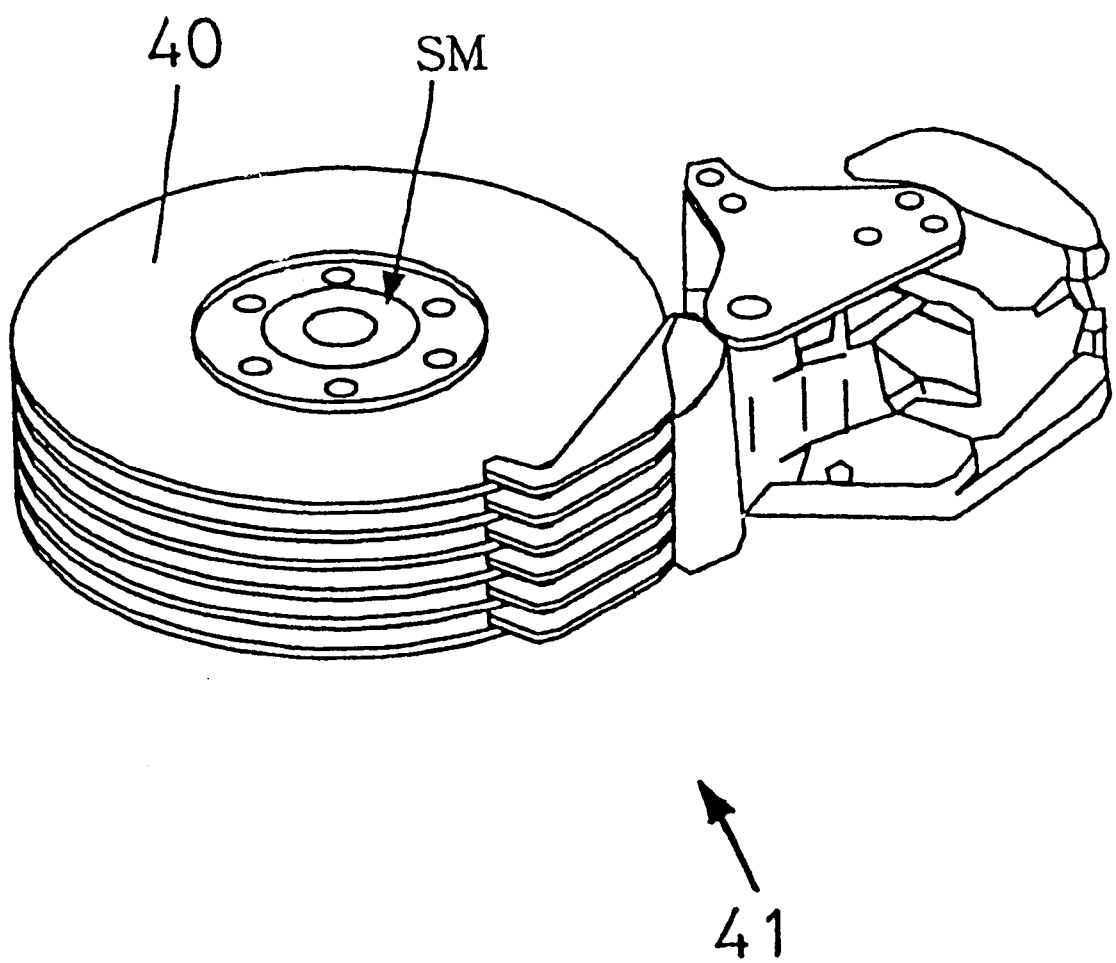
FIG. 8 is a external view of a rotary apparatus using the spindle motor.

FIG. 8 shows an external view of a rotary apparatus 41 using the spindle motor, which includes said dynamic pressure bearing device. This rotary apparatus 41 is a disk device, constructed by fitting a rotary portion 40, such as a magnetic disk, a optical disk, a polygon mirror or the like to the rotary member 17 as shown in FIG. 1 of the spindle motor SM.

As described above, according to the present invention, the space having the lower portion slanted downwardly radially inwardly from the central portion for preventing the oil leakage is formed, and the opening area of this space is gradually increased in the radial direction from the central portion, so that the oil leakage from the oil sump is positively prevented.

Further, as has been described above, according to the present invention, the disk is provided for bearing, the top and bottom surfaces of the disk are used as the thrust dynamic pressure bearing portions for supporting the rotary member in the axial direction, whereas the outer circumferential surface of the disk is used as the radial dynamic pressure bearing portion for supporting the rotary member in the radial direction.

For this reason, according to the present invention, it is possible to increase the radial length of the radial dynamic pressure bearing portion in comparison with the conventional bearing. Accordingly, even if its height is reduced, it is possible to obtain a rigidity enough to support the rotary member. Accordingly, in order to miniaturize and flatten the rotary member to be born, it is possible to reduce the overall height of the dynamic pressure bearing while keeping a sufficient rigidity.

What I claim is:

1. A dynamic pressure bearing device comprising: a dynamic pressure bearing having a stationary portion fixed to a stationary base and a disk integral with the stationary portion, the disk having top and bottom surfaces for use as thrust dynamic pressure bearing portions and having an outer circumferential surface for use as a radial dynamic pressure bearing portion; a rotary member supported for rotation at an outer circumference of the dynamic pressure bearing, the thrust dynamic bearing portions of the disk supporting the rotary member in an axial direction thereof, and the radial dynamic pressure bearing portion of the disk supporting the rotary member in a radial direction thereof; a gap disposed between the dynamic pressure bearing and the rotary member for receiving oil; and a space in fluid communication with the gap and disposed between the rotary member and the stationary base, the space having a central portion slanted downwardly in the radial direction for preventing leakage of the oil and having a diameter increasing gradually from the central portion in the radial direction.

2. A dynamic pressure bearing device according to claim 1; further comprising an oil sump in fluid communication with the gap and disposed between the rotary member and the stationary base.

3. A dynamic pressure bearing device according to claim 1; further comprising a plurality of thrust grooves formed on each of the top surface and the bottom surface of the disk in a circumferential direction thereof, and a plurality of radial grooves formed on the outer circumferential surface of the disk.

4. In a spindle motor, a rotor having a dynamic pressure bearing device according to claims 1 or 3.

5. In a rotary apparatus having a rotary portion, a spindle motor according to claim 4 for driving the rotary portion.

6. A dynamic pressure bearing device comprising: a stationary portion; and a disk fixed to the stationary portion, the disk having top and bottom surfaces for use as thrust dynamic pressure bearing portions for supporting a rotary member in an axial direction and having an outer circumferential surface for use as a radial dynamic pressure bearing portion for supporting the rotary member in a radial direction.

7. A dynamic-pressure bearing device according to claim 6; further comprising a plurality of thrust grooves formed on each of the top surface and the bottom surface of the disk in a circumferential direction thereof, and a plurality of radial grooves formed on the outer circumferential surface of the disk.

8. In a spindle motor, a rotor having a dynamic pressure bearing device according to claims 6 or 7.

9. In a rotary apparatus having a rotary portion, a spindle motor according to claim 8 for driving the rotary portion.

10. A dynamic pressure bearing device comprising: a rotary member mounted for rotation; and a dynamic pressure bearing rotatably supporting the rotary member, the dynamic pressure bearing having a stationary portion, and a disk integrally connected to the stationary portion, the disk having surface portions defining thrust and radial dynamic pressure bearing portions for supporting the rotary member in axial and radial directions, respectively.

11. A dynamic pressure bearing device according to claim 10; including a gap between the dynamic pressure bearing and the rotary member for receiving oil, and a passage in fluid communication with the gap, the passage having a central portion slanted downwardly in the radial direction for preventing leakage of the oil and having a diameter increasing gradually from the central portion in the radial direction.

12. A dynamic pressure bearing device according to claim 11; wherein the surface portions defining thrust and radial dynamic pressure bearing portions includes means defining a plurality of thrust grooves and radial grooves, respectively, for receiving the oil.

13. In a spindle motor, a rotor having a dynamic pressure bearing device according to claims 10, 11 or 12.

14. In a rotary apparatus having a rotary portion, a spindle motor according to claim 13 for driving the rotary portion.

* * * * *